No. 880,527. PATENTED MAR. 3, 1908.
J. HEPP.
DIGGER.
APPLICATION FILED JULY 23, 1907.
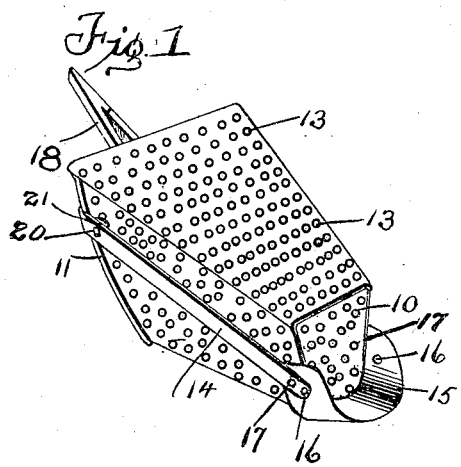
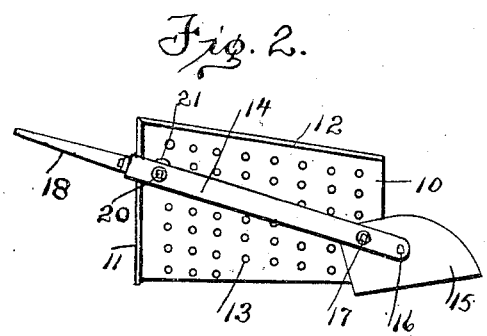
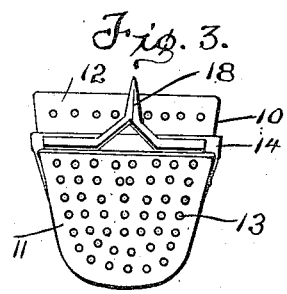

UNITED STATES PATENT OFFICE.

JACOB HEPP, OF SHIVELY, KENTUCKY.

DIGGER.

No. 880,527.        Specification of Letters Patent.        Patented March 3, 1908.

Application filed July 23, 1907. Serial No. 385,101.

*To all whom it may concern:*

Be it known that I, JACOB HEPP, a citizen of the United States, residing at Shively post-office, in the county of Jefferson and State of Kentucky, have invented certain new and useful Improvements in Diggers; and I do hereby declare the following to be a full, clear, and exact description of the invention, such as will enable others skilled in the art to which it appertains to make and use the same.

The invention relates to diggers and it has special reference to diggers which are adapted to take up onions and like vegetables.

The invention has for its object a device that will catch up the vegetable and the necessarily accompanying dirt and that will, by a shaking of the device, separate the dirt from the vegetable.

A further object of the invention is to so construct a device of this character as to enable it to be carried in the hands of an operator who can easily shake the digger after he has taken up a quantity of the soil and vegetables.

It is of course to be understood that this device may be used not only in digging and handling vegetables but also for any other purpose for which its construction will permit.

In the drawings: Figure 1 is a perspective view of the improved device. Fig. 2 is a side elevation of the same, and Fig. 3 is a rear end elevation.

In the drawings which form a part of this specification and which illustrate a form of this invention 10 designates a receptacle which is formed of a sheet of metal in substantially U shape having its rear end enlarged and being closed by a rear plate 11 and a cover or top 12. These three members which form the receptacle are preferably constructed of sheet metal having a plurality of perforations 13.

Passing around and secured to the receptacle, on the sides and across the back, is a strip or reinforcing member 14 which supports a shovel or spade portion 15 at the front or small end of said receptacle. This shovel 15 is formed of sheet metal having an outer cutting edge and being of U formation conforming to the shape of the receptacle. The ends of the bail 14 extend a short distance beyond the receptacle, upon which is supported the shovel 15 by means of rivets 16 which pass through the bail and shovel and also by the bolts 17 which pass through the bail, the shovel and the plate 10. The bolt 17 serves the double purpose of securing the bail in position and also in firmly holding the shovel.

Secured to the bail 14 at the rear end of the receptacle is placed any suitable means 18 for supporting a handle by which the device may be operated. Supporting the rear end of bail 14 is a bolt 20 which passes through the bail and through the plate 10 having a washer 21 interposed between them.

In operation the device is taken and used as a shovel in lifting the vegetable by which action a quantity of the soil is also lifted in the shovel. The operator then shakes the receptacle separating the vegetable from the soil and allowing the soil to pass out through the perforations 13.

This device can be constructed not only of sheet metal as was herein before described but it can be made of any material which would be suitable for instance out of wire or of wire netting which would not alter the shape of the receptacle in which the perforations are made for the purpose of sifting out the soil from the onions or the material to be gathered by the implement, and with the use of wire or wire netting the meshes would be formed of such a size as to serve the same purpose as the perforations in the sheet metal receptacle.

The claims are:

1. A device of the character described comprising a receptacle having an open end, a cover for said receptacle, and a rear closure for said receptacle, all of said members being formed of perforated sheet metal, and a shovel attached to the open end of said receptacle.

2. In a device of the character described a shovel and a receptacle, said receptacle comprising a metal plate of U formation, said metal plate being enlarged at one end, a rear closure at the enlarged end of said plate and a cover mounted across the ends of said plate all of said members being perforated.

3. In a device of the character described a perforated receptacle, a bail around said receptacle and a shovel carried at the ends of said bail.

4. In a device of the character described a receptacle a bail passing around said receptacle, a shovel mounted at ends of said bail and means for attaching a handle to said bail.

In testimony whereof I affix my signature in presence of two witnesses.

JACOB HEPP.

Witnesses:
 FRED. FORCHT, Jr.,
 LOUIS BUEHNER.